US012139191B2

(12) United States Patent
Cascajar Ordonez (10) Patent No.: US 12,139,191 B2
(45) Date of Patent: Nov. 12, 2024

(54) AUTONOMOUS OMNIDIRECTIONAL DRIVE UNIT

(71) Applicant: ASTI MOBILE ROBOTICS, S.A.U., Madrigalejo del Monte (ES)

(72) Inventor: Luis Cascajar Ordonez, Burgos (ES)

(73) Assignee: ASTI MOBILE ROBOTICS, S.A.U., Madrigalejo del Monte (ES)

( * ) Notice: Subject to any disclaimer, the term of this patent is extended or adjusted under 35 U.S.C. 154(b) by 420 days.

(21) Appl. No.: 17/441,119

(22) PCT Filed: Jan. 8, 2020

(86) PCT No.: PCT/EP2020/050275
§ 371 (c)(1),
(2) Date: Sep. 20, 2021

(87) PCT Pub. No.: WO2020/187457
PCT Pub. Date: Sep. 24, 2020

(65) Prior Publication Data
US 2022/0161848 A1 May 26, 2022

(30) Foreign Application Priority Data
Mar. 20, 2019 (EP) .................................... 19382200

(51) Int. Cl.
*B62D 11/00* (2006.01)
*B60K 1/02* (2006.01)
(Continued)

(52) U.S. Cl.
CPC .............. *B62D 11/003* (2013.01); *B60K 1/02* (2013.01); *B60K 1/04* (2013.01); *B60L 15/20* (2013.01); *G05D 1/0231* (2013.01); *B66F 9/063* (2013.01)

(58) Field of Classification Search
CPC ...... B62D 11/003; B62D 1/283; B62D 11/04; B62D 15/00; B60K 1/02; B60K 1/04;
(Continued)

(56) References Cited

U.S. PATENT DOCUMENTS

2013/0302132 A1 11/2013 D'Andrea
2016/0288687 A1* 10/2016 Scherle ................... B66F 9/063
(Continued)

FOREIGN PATENT DOCUMENTS

AU 2014338685 A1 4/2016
CN 101885350 A 11/2010
(Continued)

OTHER PUBLICATIONS

International Search Report and Written Opinion for PCT/EP2020/050275 dated Mar. 16, 2020.

*Primary Examiner* — Justin S Lee
*Assistant Examiner* — Wenyuan Yang
(74) *Attorney, Agent, or Firm* — LUCAS & MERCANTI, LLP (57) ABSTRACT

An autonomous omnidirectional drive unit including a drive chassis supported on two independent, parallel, and coaxial drive wheels, actuated by two drive motors; a transport chassis the central area of which is superimposed on and connected to the drive chassis through a rotary joint, the transport chassis being supported on multiple omnidirectional wheels. The drive unit further includes a rotating device, actuated by a rotary motor, integrated in the rotary joint between the transport chassis and the drive chassis, which determines the angular position of the drive chassis with respect to the transport chassis, and a control device configured for adjusting at least the two drive motors and the rotary motor in a coordinated manner to obtain omnidirectional movement of the transport chassis.

10 Claims, 6 Drawing Sheets

(51) Int. Cl.
   *B60K 1/04* (2019.01)
   *B60L 15/20* (2006.01)
   *B66F 9/06* (2006.01)
   *G05D 1/00* (2024.01)

(58) Field of Classification Search
   CPC ....... B60L 15/20; G05D 1/0231; B66F 9/063; Y02T 10/72
   See application file for complete search history.

(56) References Cited

U.S. PATENT DOCUMENTS

| | | | | |
|---|---|---|---|---|
| 2016/0297653 | A1* | 10/2016 | Herre | B60L 53/12 |
| 2019/0016573 | A1* | 1/2019 | D'Andrea | G06Q 50/28 |
| 2019/0291631 | A1* | 9/2019 | Bettella | B41F 5/24 |
| 2020/0198946 | A1* | 6/2020 | Chow | B65G 1/0492 |
| 2020/0198947 | A1* | 6/2020 | Chow | B66F 9/063 |
| 2020/0283279 | A1* | 9/2020 | Chow | B66F 9/22 |
| 2023/0166792 | A1* | 6/2023 | Schwaiger | B62D 7/1509 |
| | | | | 180/6.2 |

FOREIGN PATENT DOCUMENTS

| | | | | |
|---|---|---|---|---|
| CN | 101885350 B | * | 2/2012 | |
| CN | 102380866 A | | 3/2012 | |
| DE | 202009015783 U1 | | 2/2010 | |
| EP | 2744741 A1 | | 6/2014 | |
| EP | 2627553 B1 | * | 7/2015 | ............ B62D 11/02 |
| WO | 2013023721 A1 | | 2/2013 | |
| WO | 2015059556 A1 | | 4/2015 | |
| WO | 2018165907 A1 | | 9/2018 | |

* cited by examiner

AUTONOMOUS OMNIDIRECTIONAL DRIVE UNIT

CROSS REFERENCE TO RELATED APPLICATION

This Application is a 371 of PCT/EP2020/050275 filed on Jan. 8, 2020, which claims priority of European Patent Application No. 19382200.4 filed Mar. 20, 2019, both of which are incorporated herein by reference.

FIELD OF THE ART

The present invention relates to the field of autonomous omnidirectional drive units, specifically to those drive units intended for travelling in any direction and at any time, moving on a two-dimensional plane by means of wheels, for the transport of goods in logistics centers or industrial plants. In a typical embodiment, the drive unit will be configured for being located under racks loaded with goods, lifting them up, and transporting them to a new location. This is also known as a "goods-to-person" application given that these drive units are normally intended for use in large logistics centers in which drive units bring the racks closer to operators handling the goods contained in said racks without the operators having to waste time moving around the logistics center in search of certain goods.

STATE OF THE ART

Autonomous drive units are widely known.

For example, document EP1590272B1, which describes a drive unit equipped with two parallel drive wheels supported in a chassis including other additional caster wheels, is known. The precise actuation of the two drive wheels allows steering the drive unit forward and backward (in the direction of the drive wheels) or rotating any desired angle to the right or to the left.

Document EP2044495B1 describe a similar drive unit on top of which there has been provided a platform which can be turned, as mentioned, at will with an actuator to facilitate its docking with an element containing the goods in the form of shelving under which the autonomous omnidirectional drive unit can be located.

In the two cases described, the drive unit may only move forward or backward and rotate, but it cannot perform complicated translational movements, or other more complex movements. As a consequence, its movement is slow when changing direction. Furthermore, in drive units of this type, the weight loaded on the drive unit is transmitted to the drive wheels.

An autonomous drive unit very similar to those described in preceding documents, having the same limitations but provided for being rotatably associated with a self-supporting platform on caster wheels is also known through document EP2744741B1. Any weight loaded on the platform is not transmitted to the autonomous drive unit or to its drive wheels, but rather the caster wheels. The association between the autonomous drive unit and the platform is established through a bearing, such that the free rotation of the drive unit with respect to the platform and the subsequent driving thereof in any direction in which the drive unit moves forward is allowed, allowing translation of the platform. However, this solution does not enable rotating the platform.

Document CN101885350A describes an autonomous drive unit which combines a central drive chassis with two parallel drive wheels and a transport chassis supported on caster wheels, with both chassis being connected through a rotary joint. In this case, unlike the preceding case, the rotary joint includes locking elements which allow fixing the angular position of the transport chassis with respect to the drive chassis, enabling the drive chassis to cause the transport chassis to rotate, achieving greater movement possibilities of the assembly. However, the impossibility of performing a simultaneous and independent rotation of both chassis slows their movement and limits some translational and simultaneous rotation possibilities of the drive unit, limiting its maneuverability. This document contains all the features of the preamble of the claim 1 of this invention.

Documents U.S. Pat. No. 4,221,273A, JPS6231524A have limitations similar to those described in relation to document CN101885350A.

Documents US2013302132A1 and CN102380866A describe an autonomous drive unit which includes a central drive chassis with two parallel drive wheels and with caster wheels. On top of said drive chassis there is a transport platform which, according to an embodiment, can be driven to rotate independently to the central drive chassis. According all the weight supported on the transport platform is transmitted to the drive chassis through the rotative joint placed in between, and the driver which rotates the transport platform shall rotate all that weight, requiring a powerful and heavy motor which shall be carried out by the driven chassis and which shall be feed by the batteries of the driven chassis, reducing its duration, or requiring a slow rotational movement caused by an aggressive reduction gear box, producing a slow rotational movement and a reduction in the productivity of the device.

Document WO201865907A1 describes a chassis including multiple actively driven suspension mechanisms, each including a driven wheel. Each suspension mechanism is associated with a sensor which determines the required position of such suspension mechanism to be adapted to the irregularities of the terrain on which the driven chassis circulates.

Document AU2014338685A1 describes an autonomous vehicle which includes sensors, such as laser sensors, to scan the surrounding environment to determine and plan the displacement route.

Therefore, there is not known to be any autonomous drive unit which allows complete freedom of movements, not only translational movements in any direction, but also rotational movements, and any of the combinations that these two simultaneously produced movements allow.

BRIEF DESCRIPTION OF THE INVENTION

The present invention relates to an autonomous omnidirectional drive unit.

An autonomous drive unit will be understood to be a drive unit with the ability to move following a pre-established route or generating its own route as it is moving, without a human operator having to provide control instructions.

In the context of the present document, an omnidirectional drive unit will also be understood to be a drive unit with the ability to move on a plane in any direction.

The proposed autonomous omnidirectional drive unit includes, in a manner that is known in the state of the art:
  a drive chassis supported on at least two independent parallel drive wheels coaxial with a horizontal axis, each actuated by a drive motor included in said drive chassis;

a transport chassis the central area of which is superimposed on and connected to the drive chassis through a rotary joint coaxial with a vertical axis intersecting the mentioned horizontal axis between the two drive wheels, said transport chassis extending around the drive chassis in a peripheral area, the transport chassis being supported on multiple caster wheels distributed around the drive chassis.

Therefore, the proposed drive unit consists of two superimposed chassis attached at their central part through a rotary joint having a vertical axis.

The lower chassis is a drive chassis equipped with two parallel and facing drive wheels actuated by the respective drive motors, whereas the upper chassis is supported on wheels of the type known as caster wheels, comprising both self-orienting wheels and omnidirectional wheels, for example ball wheels. The upper chassis will be devoid of drive wheels.

Actuation of the two drive wheels of the drive chassis allows any forward or backward movement of the drive chassis, driving the transport chassis with it through the rotary joint.

Independent actuation of the two drive wheels also allows any rotation to the right and left of the drive chassis about the vertical axis.

However, the present invention proposes, additionally and in a manner not known in the existing state of the art that the drive unit further includes:

a rotating device concentric with the vertical axis and associated with the rotary joint between the transport chassis and the drive chassis, actuated by a rotary motor supported in the transport chassis which determines the angular position of the drive chassis with respect to the transport chassis, and a control device configured for adjusting at least the two drive motors and the rotary motor in a coordinated manner to obtain omnidirectional movement of the transport chassis, supported on multiple caster wheels.

Therefore, actuation of the rotary motor, in coordination with the actuation of the two drive motors guiding the drive wheels, will allow a relative rotation to occur between the transport chassis and the drive chassis, obtaining a freedom of movements which would not be possible without said rotary motor.

For example, the presence of said rotary motor may allow the transport chassis to rotate while translation of the drive chassis occurs at the same time.

The position of the drive motor in the transport chassis permits achieving a more lightweight and compact drive chassis, which can be more easily rotated.

Likewise, it may allow the drive chassis to perform a complex movement which combines displacements and rotations, but said rotations are not transferred to the transport chassis, as they are compensated for and counteracted by the rotary motor, which prevents them from being transmitted to the transport chassis.

This would allow the drive chassis, for example, to follow a curved path without the transport chassis experiencing any rotation, therefore obtaining lateral translation of the transport chassis.

Said control device may be supported in the transport chassis thereby maintaining a smaller size of the drive chassis.

It is additionally proposed for the drive chassis to further include a shock absorbing device placed between the drive wheels and the rotary joint. Said shock absorbing device will allow assuring proper contact between the drive wheels and the ground at all times, especially if the shock absorbing device is partially compressed.

The shock absorbing device may consist, for example, of elastically compressible elements placed between a first portion of the drive chassis which supports the drive wheels and a second portion of the drive chassis which supports the rotary joint. For example, the use of springs is contemplated, although other elements such as rubber pads or pneumatic pistons are also contemplated. This feature can be implemented in an alternative autonomous omnidirectional drive unit with different essential features than those described in the present application. Said alternative autonomous omnidirectional drive unit can be basis for a divisional application and can be combined with any of the other features described in this application. This alternative autonomous omnidirectional drive unit will include the following essential features:

a drive chassis supported at least on two independent parallel drive wheels which are coaxial with a horizontal axis, each drive wheel being actuated by a drive motor included in said drive chassis;

a transport chassis the central area of which is superimposed on and connected to the drive chassis through a rotary joint which is coaxial with a vertical axis, the vertical axis intersecting the mentioned horizontal axis between the two drive wheels, said transport chassis extending around the drive chassis in a peripheral area, the transport chassis being supported on multiple caster wheels distributed around the drive chassis;

a rotating device concentric with the vertical axis and integrated in the rotary joint between the transport chassis and the drive chassis, actuated by a rotary motor which determines the angular position of the drive chassis with respect to the transport chassis about the vertical axis, and a control device configured for adjusting at least the two drive motors and the rotary motor in a coordinated manner to obtain omnidirectional movement of the transport chassis;

wherein the drive chassis further includes a shock absorbing device consists of elastically compressible elements placed between a first portion of the drive chassis which supports the drive wheels and a second portion of the drive chassis which supports the rotary joint.

According to a preferred embodiment, the rotating device includes a gear ring integrally attached to the drive chassis to which there is connected a gear actuated by the rotary motor, thereby achieving precise control of the angular position that is obtained. Preferably the gear ring will be integrally attached to the drive chassis, surrounding the rotary joint, thereby achieving a more lightweight and compact drive chassis.

The drive unit will also contain at least one rechargeable electric battery. Said battery may be supported in the transport chassis in connection with the drive motors through a rotary electrical contact concentric with the vertical axis and integrated in the rotary joint. This feature allows concentrating the weight of the batteries in the transport chassis, allows reducing the weight of the drive chassis and therefore reducing its inertias, which thereby allows increasing its rotational speed and reducing the stress sustained by the rotating device and the rotary motor, which thereby allows reducing the size and weight thereof. Optionally this feature can be implemented in an alternative autonomous omnidirectional drive unit with different essential features than those described in the present application. Said alternative autonomous omnidirectional drive unit can be basis for a divisional application and can be combined with any of the other features described in this application. This alternative autonomous omnidirectional drive unit will include the following essential features:
- a drive chassis supported at least on two independent parallel drive wheels which are coaxial with a horizontal axis, each drive wheel being actuated by a drive motor included in said drive chassis;
- a transport chassis the central area of which is superimposed on and connected to the drive chassis through a rotary joint which is coaxial with a vertical axis, the vertical axis intersecting the mentioned horizontal axis between the two drive wheels, said transport chassis extending around the drive chassis in a peripheral area, the transport chassis being supported on multiple caster wheels distributed around the drive chassis;
- a rotating device concentric with the vertical axis and integrated in the rotary joint between the transport chassis and the drive chassis, actuated by a rotary motor which determines the angular position of the drive chassis with respect to the transport chassis about the vertical axis, and
- a control device configured for adjusting at least the two drive motors and the rotary motor in a coordinated manner to obtain omnidirectional movement of the transport chassis; and
- at least one rechargeable electric battery supported in the transport chassis in connection with the drive motors through a rotary electrical contact concentric with the vertical axis integrated in the rotary joint.

Preferably, instead of at least one battery the drive unit will include two symmetrical batteries arranged on either side of the drive chassis, in opposing distal areas, achieving a uniform weight distribution in the transport chassis, and a center of inertia concentric with the vertical axis.

According to a preferred embodiment of the invention, the multiple caster wheels will be distributed around the drive chassis in radial symmetry. This arrangement assures that a weight centered on the transport platform will be uniformly distributed on the caster wheels located around the drive chassis.

According to an envisaged embodiment of the drive unit, the transport chassis will support obstacle detecting sensors selected from laser sensors or cameras. Said obstacle detecting sensors will be oriented towards the areas surrounding the drive unit to allow detecting any obstacle existing in said surrounding areas before the drive unit runs into said obstacle, preventing accidents or collisions that may lead to an unexpected modification of the position of the drive unit, which would lead to a change in its path or deviation in its future movements.

Preferably, the obstacle detecting sensors of the transport chassis are located in a skirting of the transport chassis surrounding at least the drive chassis and the caster wheels, and the lower edge of which is only slightly raised off the ground.

Preferably, the obstacle detecting sensors will be integrated in the transport chassis behind panels that are transparent to the radiations measured by said sensors.

Said skirting may also include control buttons, emergency shutdown buttons, an information display showing the state or instructions of the drive unit, lights, or charging sockets for the batteries, for example.

It is furthermore proposed for the transport chassis to be able to additionally or alternatively support guiding sensors selected from: rotary joint angular position sensor, accelerometer, gyroscope, or optical flow sensor. These guiding sensors will allow knowing the exact position of the drive chassis with respect to the transport chassis at all times, or knowing the accelerations and rotations of the transport chassis to check that they correspond with accelerations caused by actuation of the drive motors and the rotary motor.

It is also contemplated for the drive chassis to support guiding sensors selected from: magnetic antennas, camera with a downward orientation. Magnetic antennas allow following a path marked on the ground by means of magnetic strips, and the camera with a downward orientation, i.e., oriented towards the ground where the drive unit is travelling, allows identifying marks included on said ground to help the drive unit know its position and to help with the guiding thereof. Said marks may be lines or also barcodes, QR codes, or the like.

A raisable platform attached to the transport chassis through a lifting device, having a technology that is known (see the mentioned background documents), configured for moving the raisable platform in a direction parallel to the vertical axis, is proposed to be located on the transport chassis. Therefore, after placing the autonomous omnidirectional drive unit under a rack loaded with goods, the raising of the raisable platform will allow lifting said rack, loading it on said autonomous omnidirectional drive unit for the transport thereof. The racks will typically be in the form of a shelving unit loaded with a variety of products.

The raisable platform may include load sensors selected from: inductive sensor, load cell, camera with an upward orientation. A camera with an upward orientation will be understood to be a camera oriented in the direction of the vertical axis focused upwardly, which would allow detecting when the drive unit is located under a load.

Other features of the invention will become apparent in the following detailed description of an embodiment.

BRIEF DESCRIPTION OF THE DRAWINGS

The preceding and other advantages and features will be better understood based on the following detailed description of an embodiment in reference to the attached drawings, which must be interpreted in an illustrative and non-limiting manner, in which.

DETAILED DESCRIPTION OF AN EMBODIMENT

The attached drawings show illustrative and non-limiting embodiments of the present invention.

Figure 1:
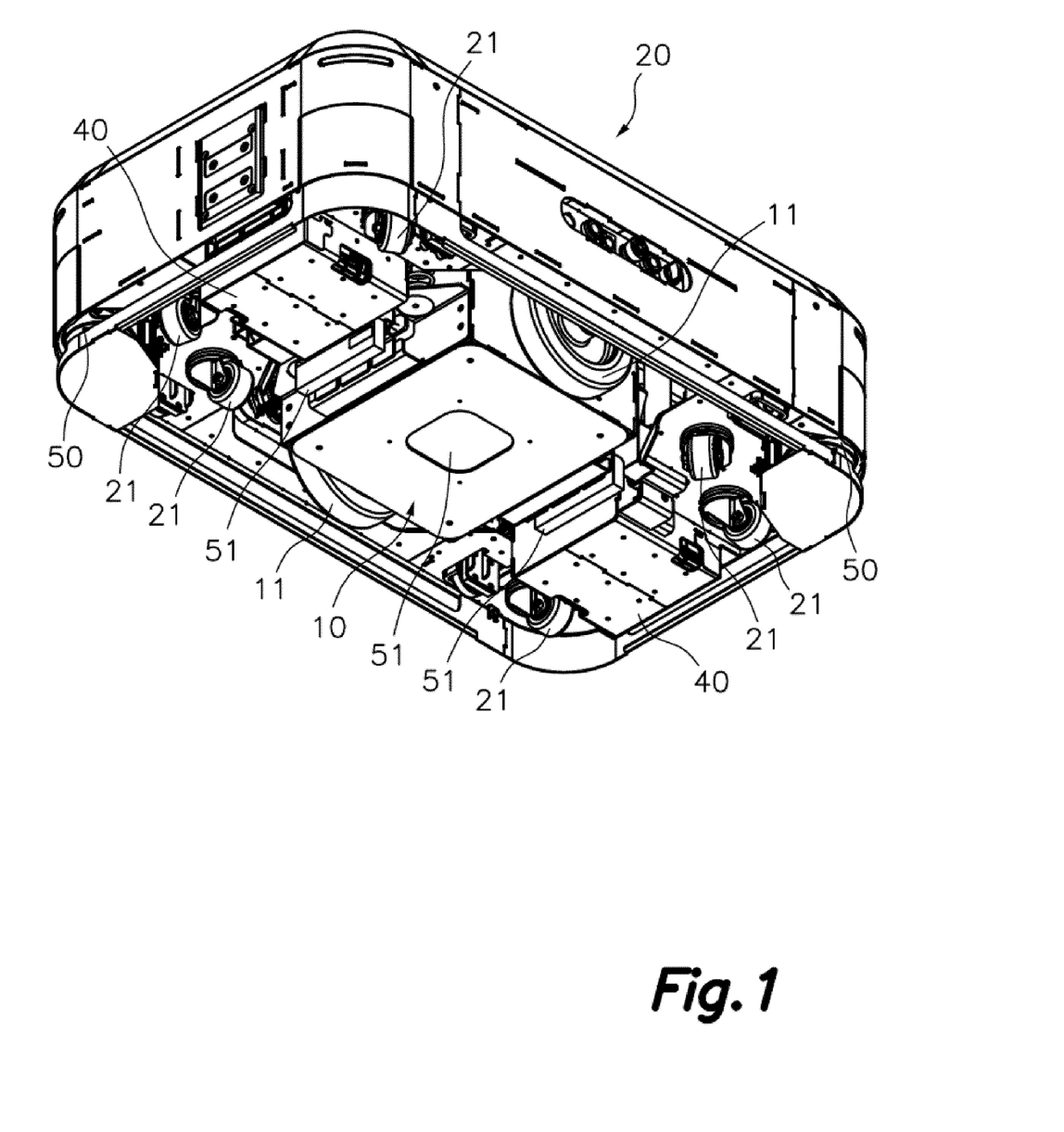
FIG. 1 is a bottom perspective view of the autonomous omnidirectional drive unit.
Figure 2:
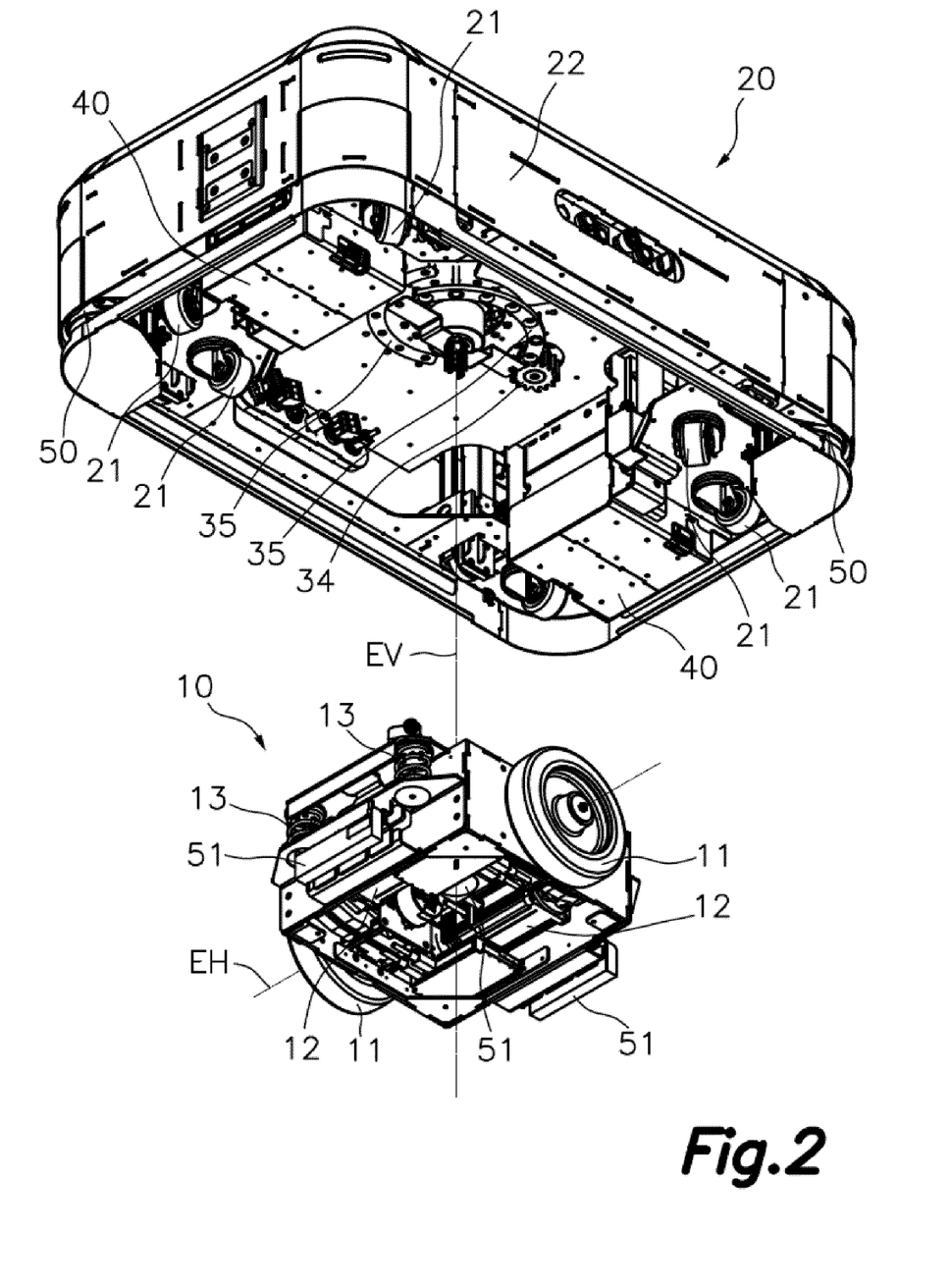
FIG. 2 shows the same drive unit illustrated in FIG. 1 but with the transport chassis being separated from the drive chassis and from which the lower cover has additionally been removed, leaving its internal contents in sight.
Figure 3:
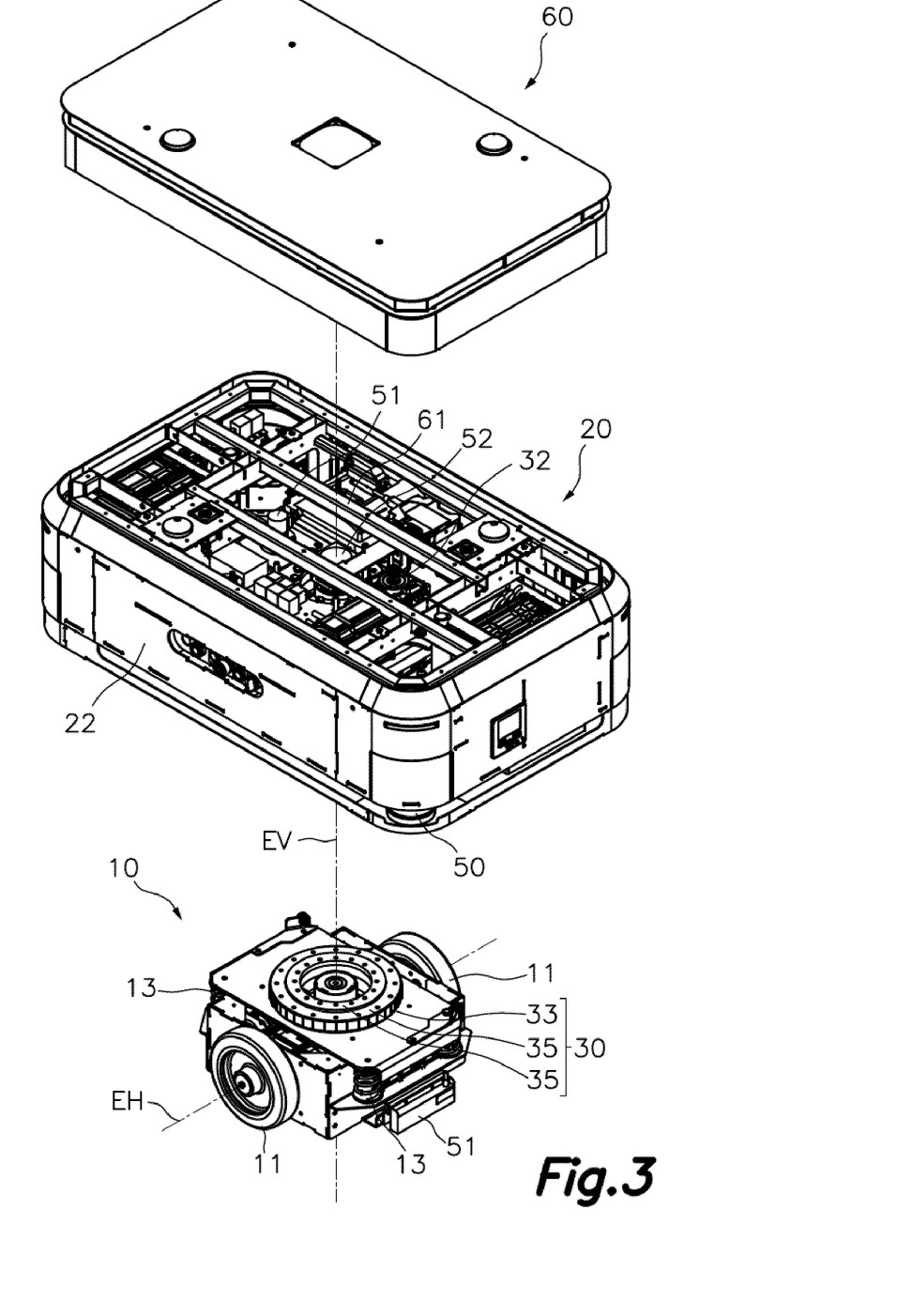
FIG. 3 depicts the same drive unit of FIG. 2 but in a top perspective view, furthermore showing the raisable platform separated from the transport chassis, leaving the contents of the transport chassis in sight.

According to an embodiment shown in FIGS. 1, 2, and 3, the proposed autonomous omnidirectional drive unit consists of a drive chassis 10 and a transport chassis 20.

In this embodiment, the drive chassis 10 presents a general quadrangular shape, with its corners being beveled and including two drive wheels 11 located on opposite sides of the mentioned drive chassis 10, both drive wheels 11 being aligned with a horizontal axis EH going through the center of the drive chassis 10.

There are arranged inside the drive chassis 10 two drive motors 12, each of which is connected to a respective one of the drive wheels 11 through a reduction gearbox. Independent and precise actuation of both drive wheels 11 allows the forward or backward movement of the drive chassis 10 or any clockwise or counterclockwise rotation thereof.

The transport chassis 20 of the present embodiment is proposed to be an elongated chassis having a general rectangular shape. The transport chassis 20 is superimposed and centered on the drive chassis 10, with the drive chassis 10 and the transport chassis 20 being connected through a rotary joint 30 which allows relative rotation between the two chassis 10, 20, about a vertical axis EV as a result of a circular bearing.

The rotary joint 30 incorporates around same a gear ring 33, also concentric with the vertical axis EV, with the gear ring 33 being fixed to the drive chassis 10. A gear 34 is kinematically connected to a rotary motor 32 which is supported in the transport chassis 20 and meshed with the gear ring 33 in this example, together constituting a rotating device 31.

Actuation of the rotary motor 32 leads to, through the gear 34 and the gear ring 33, rotation of the drive chassis 10 with respect to the transport chassis 20, and vice versa.

The drive unit furthermore incorporates a control device, such as for example a programmable logic controller (PLC), a control unit with processing capability, an onboard computer, or the like, providing an assembly programmed for controlling the two drive motors 12 and the rotary motor 32 in a coordinated manner to provide both translational and rotational omnidirectional movement of the transport chassis 20 in any direction by means of proper steering of the drive chassis 10 and precise angular positioning of the transport chassis 20 with respect to the drive chassis 10 as a result of the rotating device 31.

Figure 4:
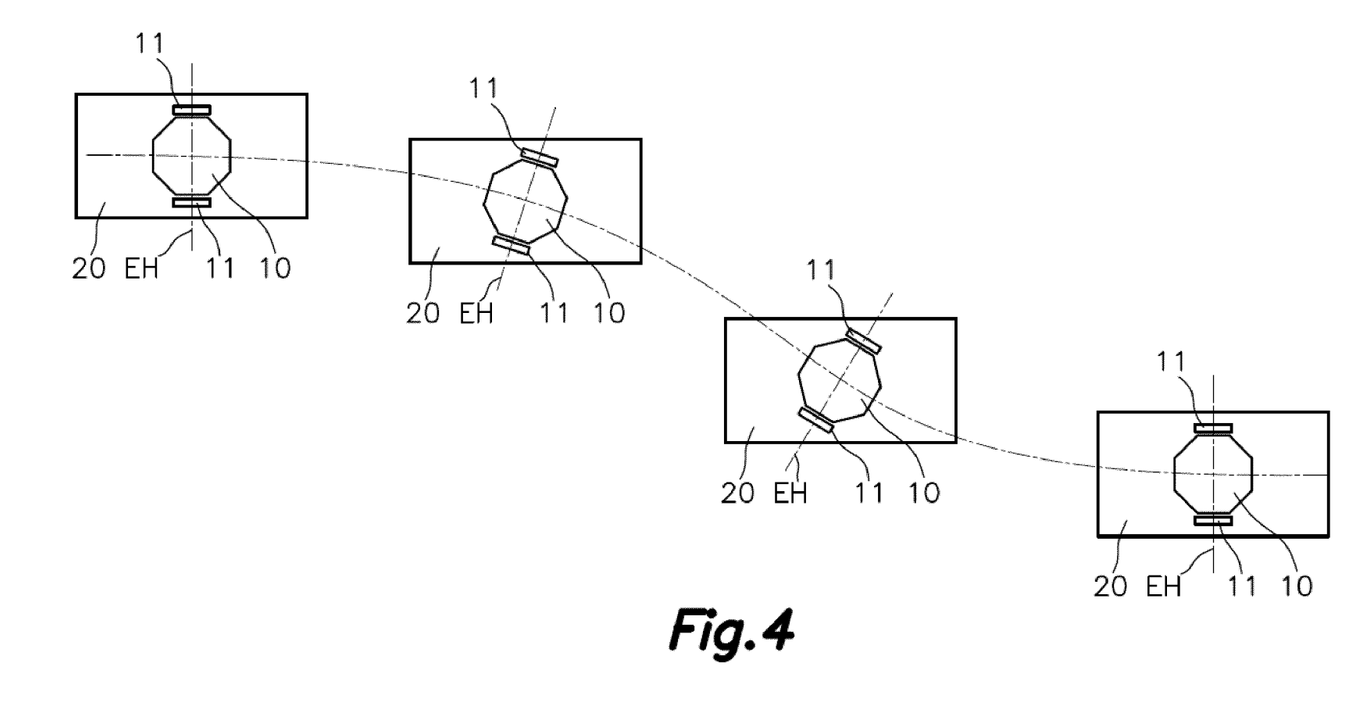
FIG. 4 shows a schematic plan view of the drive unit of this invention, the drive chassis following a curved path marked with a discontinuous line while the transport chassis maintains a constant orientation.

FIG. 4 shows an example of the movement possibilities of the proposed drive unit. In this case, the drive chassis follows a curved path by means of a combination of rotation and forward movement. However, the transport chassis 20 is moved only by means of translation, without rotation occurring in said transport chassis 20 despite the fact that drive chassis 10 does rotate. That is possible as a result of the rotating device 31 compensating for said rotation of the drive chassis 10, maintaining the transport chassis 20 along a specific direction during movement. Many other different combinations of movements are possible, as will be obvious to a skilled person.

Figure 5:
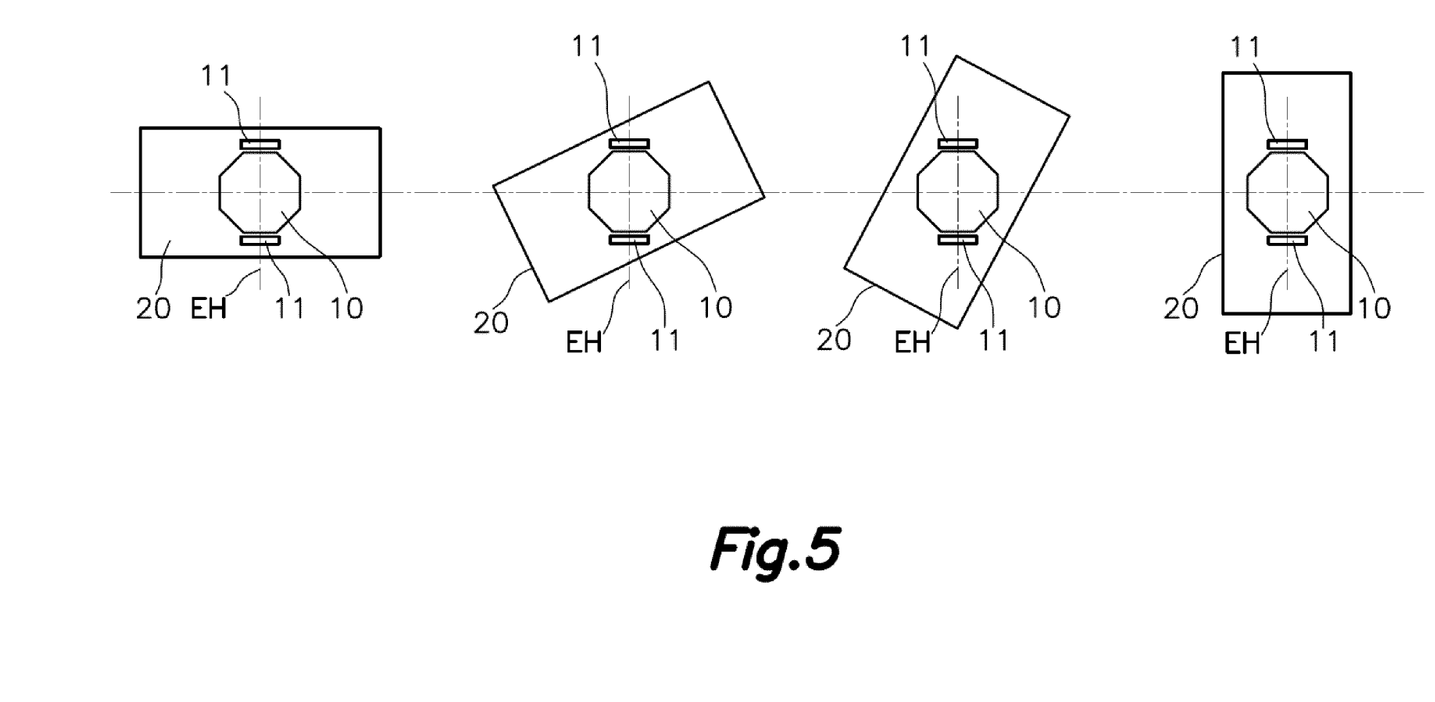
FIG. 5 shows a schematic plan view of the drive unit of this invention, following a straight path marked with a discontinuous line while the transport chassis rotates with respect to the drive chassis at the same time.

FIG. 5 shows an additional example of the movement possibilities of the proposed drive unit, according to which the drive chassis 10 is moved in a straight line, whereas the transport chassis 20 simultaneously rotates 90° with respect to the drive chassis 10, thereby modifying the position of a rack 70 supported on the transport chassis 20 while at the same time its translational movement takes place, making up for lost time with respect to other drive units without these movement capabilities.

To obtain the most compact drive chassis 10 possible, in the present embodiment shown in FIGS. 1, 2, and 3 the batteries 40 powering the autonomous drive unit are supported in the transport chassis 20, this example including two symmetrical batteries 40 at the ends of the transport chassis 20 farthest away from the drive chassis 10, in radial symmetry about the vertical axis EV. This arrangement improves weight distribution, providing greater stability to the transport chassis 20, and furthermore places the center of mass, and therefore the center of inertia, of the transport chassis 20 concentric with the vertical axis EV, facilitating precise movement of the transport chassis 20. This solution furthermore reduces the weight of the drive chassis 10, making it easier for it to rotate with greater accelerations, therefore obtaining a more maneuverable drive unit.

The batteries 40 power the drive motors 12 through a rotary electrical contact 35 (for example, a 360 degree rotary joint by means of brushes, for transferring signals and power) concentric with the vertical axis EV and also integrated in the rotary joint 30, allowing the transmission of electric power through said rotary joint 30.

As indicated, the transport chassis 20 is supported on multiple caster wheels 21 distributed around the drive chassis 10. As can be seen in FIG. 2, it has been envisaged in this embodiment for said multiple caster wheels 21 to be distributed on either side of the area occupied by the batteries 40, and specifically two of them on one of the sides and a third one on the other side, the groups of two wheels and one wheel of the ends of the transport chassis 20 being arranged in diagonal opposition with respect to the lower contour of the mentioned transport chassis 20.

It is also proposed for each drive motor 12 to be located parallel to the horizontal axis EH, with the two drive motors 12 not being aligned with one another, but rather with one being located next to the other on either side of the horizontal axis EH, obtaining a compact construction of the drive chassis 10.

It is optionally proposed for there to be a space between both drive motors 12 in the center of the drive chassis 10 for including therein a guiding sensor 51 in the form of a camera with a downward orientation, i.e., oriented downwardly, focused on the ground on which the drive chassis 10 travels for the purpose of detecting guiding lines, barcodes, or QR codes printed on stickers adhered to said ground.

It can be seen in FIG. 1 how the drive chassis 10 includes, on its back cover, a window in the center through which the mentioned camera with a downward orientation can read codes arranged on the floor or support surface on which the drive unit is moved, as the drive unit travels over said codes.

It is additionally or alternatively proposed for the drive chassis 10 to further include other guiding sensors 51 in the form of magnetic antennas which allow the drive unit to detect and follow magnetic strips placed on the ground where the drive unit is travelling.

To avoid possible accidents or collisions, the inclusion of obstacle detecting sensors 50 in the transport chassis 20 is proposed, two laser sensors in two diagonally opposed corners of the transport chassis 20 are specifically included in this embodiment.

Said transport chassis 20 is surrounded by a skirting 22 intended for protecting and concealing the internal components of the transport chassis 20 and the entire drive chassis 10 therein. The obstacle detecting sensors 50 will preferably be arranged in said skirting 22, or behind same, where they can perform detection through an opening or a window with a material that is transparent to the signals detected by said obstacle detecting sensors 50.

According to the preferred application of the present omnidirectional drive unit, above the transport chassis 20 there is located a raisable platform 60 which can be hoisted in the direction of the vertical axis EV with respect to the transport chassis 20 by means of a lifting device 61, for example a scissor mechanism, hydraulic pistons, linear motors, electric drives, etc., all of which is according to well-known art, as explained.

Figure 6:
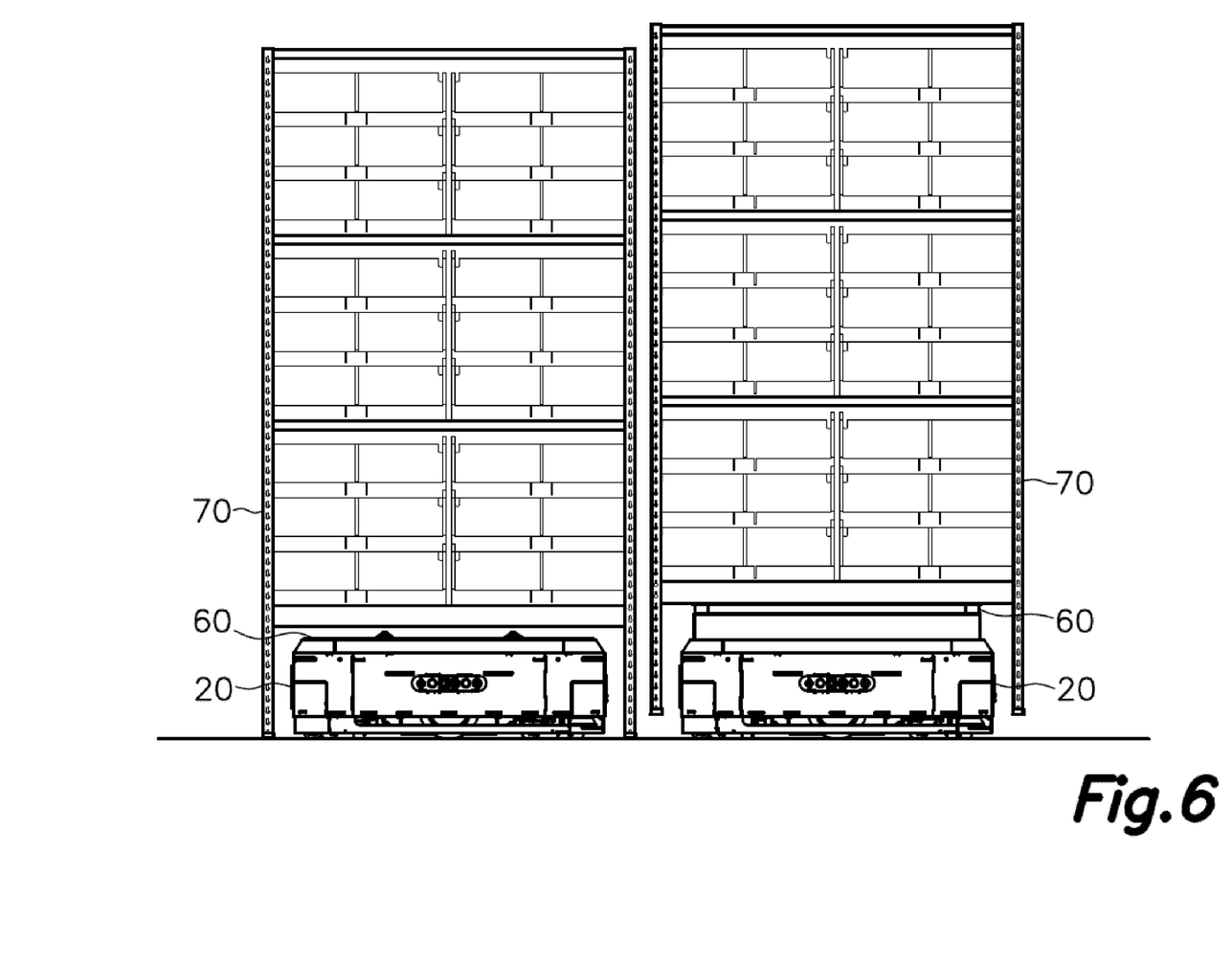
FIG. 6 shows a front elevational view of two adjacent racks, each formed by a metal frame with four legs and rectangular shelves connecting said legs, in this example further including supplements which define compartments having a smaller size for storing products, with an omnidirectional drive unit being shown below each of the two racks, one with its raisable platform withdrawn, without touching the rack, and the other one with its raisable platform in the hoisted position, lifting the entire superimposed frame centimeters off the ground, allowing the transport thereof.

After placing the drive unit below a rack 70 loaded with goods, which rack 70 is usually in the form of a shelving unit like the one shown in FIG. 6, activation of the lifting device 61 raises the raisable platform 60, lifting the rack 70 up a few centimeters, with its weight being supported on the transport chassis 20, allowing transport of the rack 70 by the drive unit to a new location.

The inclusion of load sensors 52 in the raisable platform 60 is proposed, thereby allowing the drive unit to detect the presence of a rack 70 on it.

The mentioned load sensors 52 can be, for example, inductive sensors capable of detecting the presence of a metal rack 70 on the drive unit, or use of a nadir camera, i.e., focused upwardly in the direction of the vertical axis EV, is also proposed, which allows seeing when there is an obstacle in the form of a rack 70 on the drive unit, or even detecting identification marks or codes of a rack 70 included on same.

The drawings show a camera with an upward orientation in FIG. 3, in the center of the transport chassis 20, with the raisable platform 60 including an opening in the center thereof so as to allow maintaining the line of sight of said nadir camera.

It is also proposed for the drive chassis 10 to be formed by a first portion, corresponding to the lower part, which supports the drive motors 12 and the drive wheels 11, and by a second portion, corresponding to the upper part, which supports the rotary joint 30.

Said first portion and second portion are proposed to be independent, where one may move with respect to the other, and for them to be connected through a shock absorbing device 13 that can be compressed in the direction of the vertical axis EV.

In this embodiment, the second portion consists of a flat plate on which the rotary joint 30 is fixed, with the four corners of the flat plate being connected to the rest of the drive chassis 10 by means of four springs acting like a shock absorbing device 13.

The shock absorbing device 13 will be tared so that when the drive unit is on a completely flat and smooth ground, the shock absorbing device 13 is partially compressed, transmitting certain pressure to the drive wheels 11 to assure proper grip thereof.

The shock absorbing device allows assuring that there is at all times proper and perfect contact between the drive wheels 11 and the ground, even if the ground has some irregularities, given that lack of contact between one of the drive wheels 11 and the ground will inevitably divert the drive unit from its path and could disorient it.

It will be understood that the different parts constituting the invention described in the embodiment that has been explained can be freely combined with parts of other different embodiments even though said combination has not been explicitly described, provided that such combination is not detrimental.

The invention claimed is:

1. An autonomous omnidirectional drive unit comprising:
    a single drive chassis supported on two independent parallel drive wheels which are coaxial with a horizontal axis, each drive wheel being actuated by a drive motor included in said single drive chassis;
    a transport chassis having a central area is superimposed on and connected to the single drive chassis through a rotary joint which is coaxial with a vertical axis, the vertical axis intersecting the mentioned horizontal axis between the two drive wheels, said transport chassis extending around the single drive chassis in a peripheral area, the transport chassis being supported on multiple caster wheels distributed around the single drive chassis;
    a rotating device concentric with the vertical axis and integrated in the rotary joint between the transport chassis and the single drive chassis, the rotating device comprising a gear ring integrally attached to the single drive chassis and connected to a gear actuated by a rotary motor supported in the transport chassis which determines the angular position of the single drive chassis with respect to the transport chassis about the vertical axis,
    a control device configured for adjusting at least the two drive motors and the rotary motor in a coordinated manner to obtain omnidirectional movement of the transport chassis;
    two rechargeable electric batteries supported in the transport chassis in connection with the drive motors through a rotary electrical contact concentric with the vertical axis integrated in the rotary joint, the two rechargeable electric batteries being disposed symmetrically on opposed sides of the transport chassis with the single drive chassis interposed between the two rechargeable electric batteries, achieving a uniform weight distribution in the transport chassis, and a center of inertia concentric with the vertical axis.

2. The autonomous omnidirectional drive unit according to claim 1, wherein the single drive chassis further includes a shock absorbing device placed between the drive wheels and the rotary joint.

3. The autonomous omnidirectional drive unit according to claim 2, wherein the shock absorbing device consists of elastically compressible elements placed between a first portion of the single drive chassis which supports the drive wheels and a second portion of the single drive chassis which supports the rotary joint.

4. The autonomous omnidirectional drive unit according to claim 1, wherein the transport chassis supports obstacle detecting sensors selected from laser sensors or cameras.

5. The autonomous omnidirectional drive unit according to claim 4, wherein the obstacle detecting sensors of the transport chassis are located in a skirting of the transport chassis surrounding at least the single drive chassis and the caster wheels.

6. The autonomous omnidirectional drive unit according to claim 1, wherein the transport chassis supports guiding sensors selected from: rotary joint angular position sensor, accelerometer, gyroscope, or optical flow sensor.

7. The autonomous omnidirectional drive unit according to claim 1, wherein the single drive chassis supports guiding sensors selected from: magnetic antennas or zenith camera.

8. The autonomous omnidirectional drive unit according to claim 1, wherein a lifting device, configured for moving a raisable platform in a direction parallel to the vertical axis, is supported on the transport chassis, the raisable platform located above the transport chassis.

9. The autonomous omnidirectional drive unit according to claim 8, wherein the raisable platform includes load sensors selected from inductive sensor, nadir camera, or load cell.

10. The autonomous omnidirectional drive unit according to claim 1, wherein the multiple caster wheels are distributed around the single drive chassis in radial symmetry.

* * * * *